(12) United States Patent
Oishi

(10) Patent No.: US 9,298,245 B2
(45) Date of Patent: Mar. 29, 2016

(54) INFORMATION PROCESSING APPARATUS PERFORMING PROCESSES IN PARALLEL

(71) Applicant: FUJITSU LIMITED, Kawasaki-shi, Kanagawa (JP)

(72) Inventor: Ryosuke Oishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 303 days.

(21) Appl. No.: 13/649,220

(22) Filed: Oct. 11, 2012

(65) Prior Publication Data

US 2013/0036315 A1 Feb. 7, 2013

Related U.S. Application Data

(63) Continuation of application No. PCT/JP2010/057693, filed on Apr. 30, 2010.

(51) Int. Cl.
*G06F 1/00* (2006.01)
*G06F 1/32* (2006.01)
*G06F 9/48* (2006.01)

(52) U.S. Cl.
CPC .............. *G06F 1/3206* (2013.01); *G06F 1/329* (2013.01); *G06F 9/4893* (2013.01); *Y02B 60/144* (2013.01)

(58) Field of Classification Search
CPC ...... G06F 1/3206; G06F 1/329; G06F 9/4893
USPC .......... 713/300, 320, 323, 324, 340; 718/100, 718/101, 102
See application file for complete search history.

(56) References Cited

U.S. PATENT DOCUMENTS

| | | | |
|---|---|---|---|
| 6,807,159 B1 | 10/2004 | Shorey et al. | |
| 6,965,763 B2 * | 11/2005 | Bussan et al. | 455/343.4 |
| 7,586,864 B2 | 9/2009 | Aoki | |
| 8,020,025 B2 * | 9/2011 | Hyatt | 713/502 |
| 8,495,403 B2 * | 7/2013 | Wang et al. | 713/323 |
| 8,751,841 B2 * | 6/2014 | Mendes-Carvalho et al. | 713/323 |
| 8,751,843 B2 * | 6/2014 | Meisner et al. | 713/323 |
| 8,806,100 B1 * | 8/2014 | Berendsen et al. | 710/107 |
| 2005/0125701 A1 * | 6/2005 | Hensbergen et al. | 713/320 |
| 2005/0132372 A1 | 6/2005 | Vargas et al. | |
| 2007/0233909 A1 * | 10/2007 | Derr et al. | 710/36 |
| 2009/0150696 A1 * | 6/2009 | Song et al. | 713/323 |

(Continued)

FOREIGN PATENT DOCUMENTS

| | | |
|---|---|---|
| EP | 2 063 571 | 5/2009 |
| JP | 2002-185475 | 6/2002 |
| JP | 2004-164261 | 6/2004 |

(Continued)

OTHER PUBLICATIONS

Patent Abstracts of Japan, Publication No. 2005-130436, Published May 19, 2005.
Patent Abstracts of Japan, Publication No. 2002-185475, Published Jun. 28, 2002.
Patent Abstracts of Japan, Publication No. 2005-260699, Published Sep. 22, 2005.

(Continued)

*Primary Examiner* — Jaweed A Abbaszadeh
*Assistant Examiner* — Austin Hicks
(74) *Attorney, Agent, or Firm* — Staas & Halsey LLP

(57) ABSTRACT

An information processing apparatus performing a plurality of processes in parallel includes a plurality of processing units and an adjusting unit configured to determine processing intervals of the processing units on a processing-unit-specific basis to gradually align periods in which the processing units operate.

6 Claims, 7 Drawing Sheets

(56) References Cited

U.S. PATENT DOCUMENTS

2010/0199280 A1* 8/2010 Vestal et al. .................. 718/102
2011/0302438 A1* 12/2011 Rosay .......................... 713/323

FOREIGN PATENT DOCUMENTS

| | | |
|---|---|---|
| JP | 2005-130436 | 5/2005 |
| JP | 2005-260699 | 9/2005 |
| WO | WO 2008/032750 A1 | 3/2008 |

OTHER PUBLICATIONS

Patent Abstracts of Japan, Publication No. 2004-164261, Published Jun. 10, 2004.
International Search Report of Corresponding PCT Application PCT/JP2010/057693 mailed Jul. 13, 2010.
Chinese Office Action dated Dec. 31, 2014 in corresponding Chinese Patent Application No. 201080066243.5.

* cited by examiner

FIG.6

T1 = f(PowerApiLevel1, Polling1)

T2 = f(PowerApiLevel2, Polling2)

INFORMATION PROCESSING APPARATUS PERFORMING PROCESSES IN PARALLEL

CROSS-REFERENCE TO RELATED APPLICATIONS

This application is a continuation application of International Application PCT/JP2010/057693 filed on Apr. 30, 2010 and designated the U.S., the entire contents of which are incorporated herein by reference.

FIELD

The disclosures herein relate to an information processing apparatus performing a plurality of processes in parallel and a recording medium having a power consumption management program embodied therein for use in such an information processing apparatus.

BACKGROUND

A portable device such as a portable phone, a PDA (personal digital assistants), and a note PC, when operating on the battery, may have varying battery life depending on its power consumption.

In recent years, there has been an increasing number of portable devices employing a multitask OS. Some of the portable devices employing a multitask OS may allow client software (i.e., rich software) having rich functions, rich user-interface expressiveness and operability, and rich displayed contents or the like to be added.

However, a portable device employing a multitask OS may needlessly consume electric power due to the continuous operation of rich software. A smart phone, which is an example of portable devices employing a multitask OS, has large power consumption.

A smart phone is widely used for various purposes in addition to the purpose of making a phone call. A smart phone may be used for viewing or using SMS (Short Message Service), MMS (Multimedia Messaging Service), mail such as Internet mail, Web, news, blogs, maps, traffic information, etc., as well as for playing games.

Applications such as rich software added for the purpose of implementing other functions in addition to the phone function of a smart phone may not be guaranteed to operate in conformity with the intention of hardware designers. Third-party application designers implementing software rely on the external specifications of hardware, and, thus, may not voluntarily pay attention to power consumption. Also, third-party application designers may not be positively conscious of the operations of applications designed by other application designers.

Moreover, even when a smart phone is not being operated by a user, its software and hardware constantly operate for the purpose of receiving mail, updating RSS (RDF Site Summary), searching for wireless devices (e.g., through 2G/3G/LTE, Wi-Fi, Bluetooth, infrared, etc.), and sensing (e.g., sensing for GPS, motion sensing, geomagnetism sensing, temperature sensing, light sensing, etc.).

In order to reduce power consumption, some portable devices known in the art prohibit tasks (i.e., processes) to operate in parallel, and allow only minimum necessary processes to operate in a standby state. Some related-art mobile devices known in the art conserve battery power by taking into account every aspect inclusive of applications (see Patent Document 1, for example).

Since application designers for related-art portable devices are not positively conscious of the operations of other applications, however, power reduction in one application may not produce a sufficient result due to influence from other applications.

FIG. 1 is a drawing illustrating an example of power consumption in a related-art portable device. FIG. 1 illustrates transitions of power consumption made by an application 1, an application 2, an OS 3, and a device 4. The application 1 operates at a polling interval T1. The application 2 operates at a polling interval T2. Namely, the applications 1 and 2 operate at predetermined intervals.

However, the operations of the applications 1 and 2 are unrelated to and independent of each other. It is assumed that there is no process other than the application 1 and the application 2. The application 1 and the application 2 use the device 4 that is their hardware resource. Further, it is assumed that the powers consumed by the application 1 and the application 2 are responsive to the time lengths of their respective accesses to a CPU or memory. The CPU enters the low power consumption state when all the processes are in the standby state.

The OS 3 and the device 4 exhibit large power consumption during the periods in which the application 1 and the application 2 operate. In the example illustrated in FIG. 1, the sum of powers consumed by the application 1, the application 2, the OS 3, and the device 4 is 125 mW. The sum of powers consumed by the application 1, the application 2, the OS 3, and the device 4 can be reduced by shortening the period during which the OS 3 and the device 4 exhibit large power consumption.

However, the polling intervals T1 and t2 in this related-art portable device are determined by the application designers of the application 1 and the application 2 without taking into account the power consumption of the OS 3 and the device 4. Due to this reason, the period during which the application 1 and the application 2 operate cannot be adjusted in the related-art portable device so as to shorten the periods during which the OS 3 and the device 4 exhibit large power consumption.

RELATED-ART DOCUMENTS

Patent Document

[Patent Document 1] Japanese Laid-Open Patent Publication No. 2002-185475

SUMMARY

According to an aspect of the embodiment, an information processing apparatus performing a plurality of processes in parallel includes a plurality of processing units and an adjusting unit configured to determine processing intervals of the processing units on a processing-unit-specific basis to gradually align periods in which the processing units operate.

According to another aspect, a record medium having a program embedded therein for managing power consumption is provided, the program causing a computer for performing a plurality of processes in parallel to function as a plurality of processing units and an adjusting unit configured to determine processing intervals of the processing units on a processing-unit-specific basis to gradually align periods in which the processing units operate.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a drawing for illustrating an example of the f function provided by the event management API.

DESCRIPTION OF EMBODIMENTS

In the following, embodiments of the present invention will be described with reference to the accompanying drawings.

In the following, an embodiment for carrying out the present invention will be described by referring to the accompanying drawings. In this embodiment, a description will be given by taking a portable device as an example of an information processing apparatus. The portable device of this embodiment may be a portable phone, a PDA, a note PC or the like that performs a plurality of processes in parallel.

Figure 2:
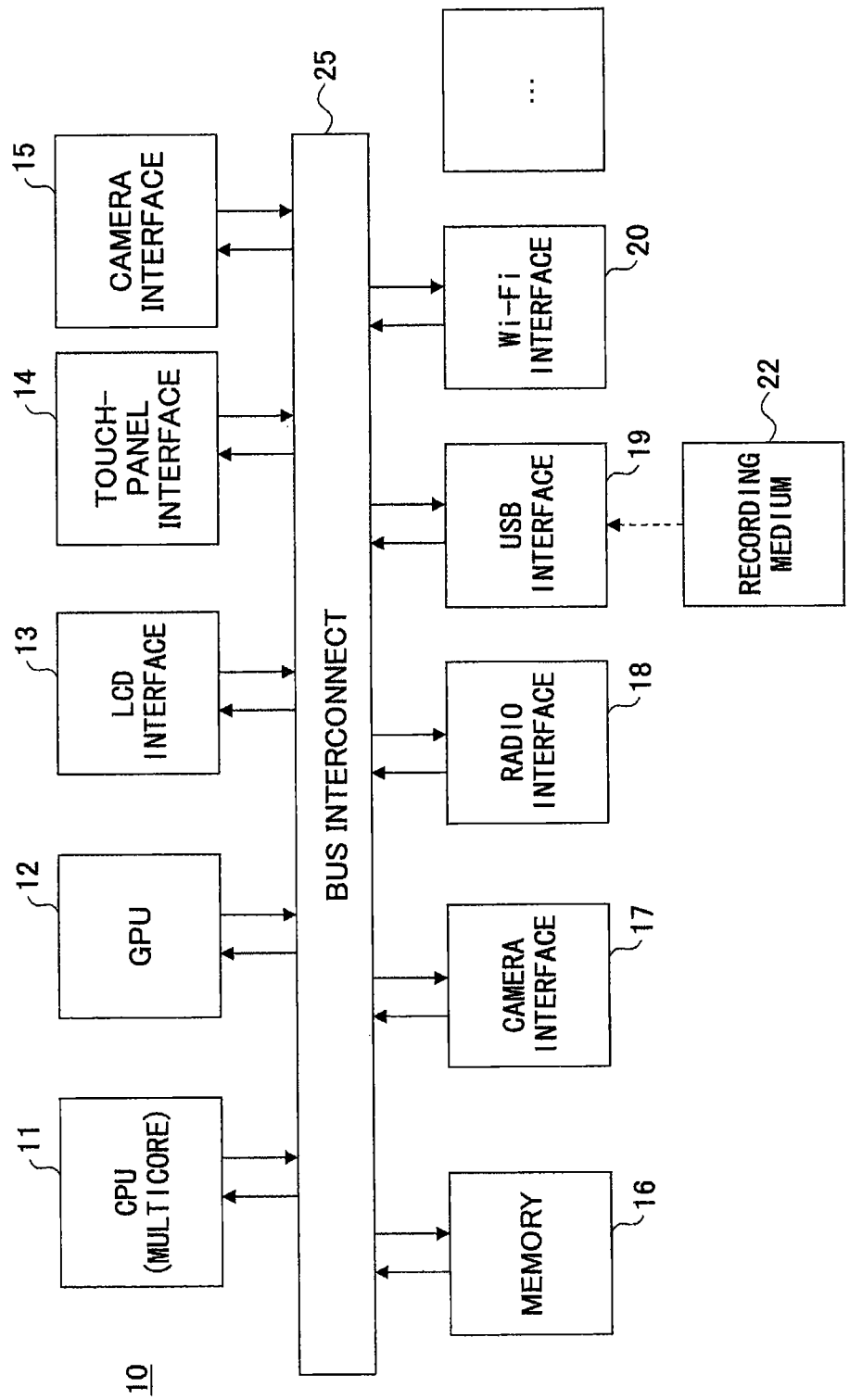
FIG. 2 is a drawing illustrating an example of the hardware configuration of a portable device of the present embodiment.

FIG. 2 is a drawing illustrating an example of the hardware configuration of a portable device 10 of the present embodiment. The portable device 10 includes a multi-core CPU 11, a GPU (graphics processing unit) 12, a LCD (liquid crystal display) interface 13, a touch-panel interface 14, a front-camera interface 15, a memory 16, a rear-camera interface 17, a radio interface 18, a USB (Universal Serial Bus) interface 19, and a Wi-Fi (Wireless Fidelity) interface 20. In FIG. 2, illustration is omitted for devices connected through the LCD interface 13, the touch-panel interface 14, the camera interfaces 15 and 17, the radio interface 18, the USB interface 19, and the Wi-Fi interface 20.

The GPU 12, the LCD interface 13, the touch-panel interface 14, the camera interface 15, the memory 16, the camera interface 17, the radio interface 18, the USB interface 19, and the Wi-Fi interface 20 connected to each other through a bus 25 can exchange data with each other under the control of the multi-core CPU 11.

The multi-core CPU 11 includes plural processor cores, each of which operates as one unit that includes an instruction generating unit, an arithmetic unit, and so on combined in one package. The CPU 11 is a central processing unit for controlling the overall operations of the portable device 10.

The GPU 12 performs computations necessary for display. The LCD interface 13 is an interface for a liquid crystal display. The touch-panel interface 14 is an interface for a touch panel. The camera interfaces 15 and 17 are an interface for respective cameras. The memory 16 includes a main memory device and an auxiliary memory device.

The radio interface 18 is an interface for a wireless device. The USB interface 19 is an interface for a peripheral device conforming to the USB standards. The Wi-Fi interface 20 is an interface for a wireless LAN device conforming to IEEE802.11a and/or IEEE802.11b, which are the wireless LAN standards.

A power consumption management program of the present embodiment is installed in the portable device 10. The portable device 10 executes the power consumption management program. The memory 16 has the power consumption management program stored therein as part of the programs for operating the portable device 10. The CPU 11 loads the power consumption management program from the memory 16 for execution.

The power consumption management program may be stored in a recording medium 22 that is readable by the portable device 10. The portable device 10 can read the power consumption management program from the recording medium 22 via the USB interface 19, for example. The power consumption management program can also be read from the recording medium 22 via another interface different from the USB interface 19.

The recording medium 22 readable by the portable device 10 may be a magnetic recording medium, an optical disk, a magnet-optical recording medium, a semiconductor memory, or the like. The magnetic recording medium includes an HDD, a flexible disk (FD), a magnetic tape (MT), and the like. The optical disk includes a DVD (Digital Versatile Disc), a DVD-RAM, a CD-ROM (Compact Disc-Read Only Memory), a CD-R(Recordable)/RW(ReWritable), and the like. The magnet-optical recording medium includes an MO (Magneto-Optical Disk). When the power consumption management program is to be distributed, the recording medium 22 of a portable-type such as a DVD or a CD-ROM in which the power consumption management program is recorded may be sold. Alternatively, an application distribution mechanism available on the Internet such as AppStore, Android Market, or the like may be used.

The portable device 10, which is to execute the power consumption management program, reads the power consumption management program from the recording medium 22 that has the power consumption management program stored therein. The CPU 11 stores the retrieved power consumption management program in the memory 16. The portable device 10 reads the power consumption management program from the memory 16 to perform processes in accordance with the power consumption management program.

Figure 3:
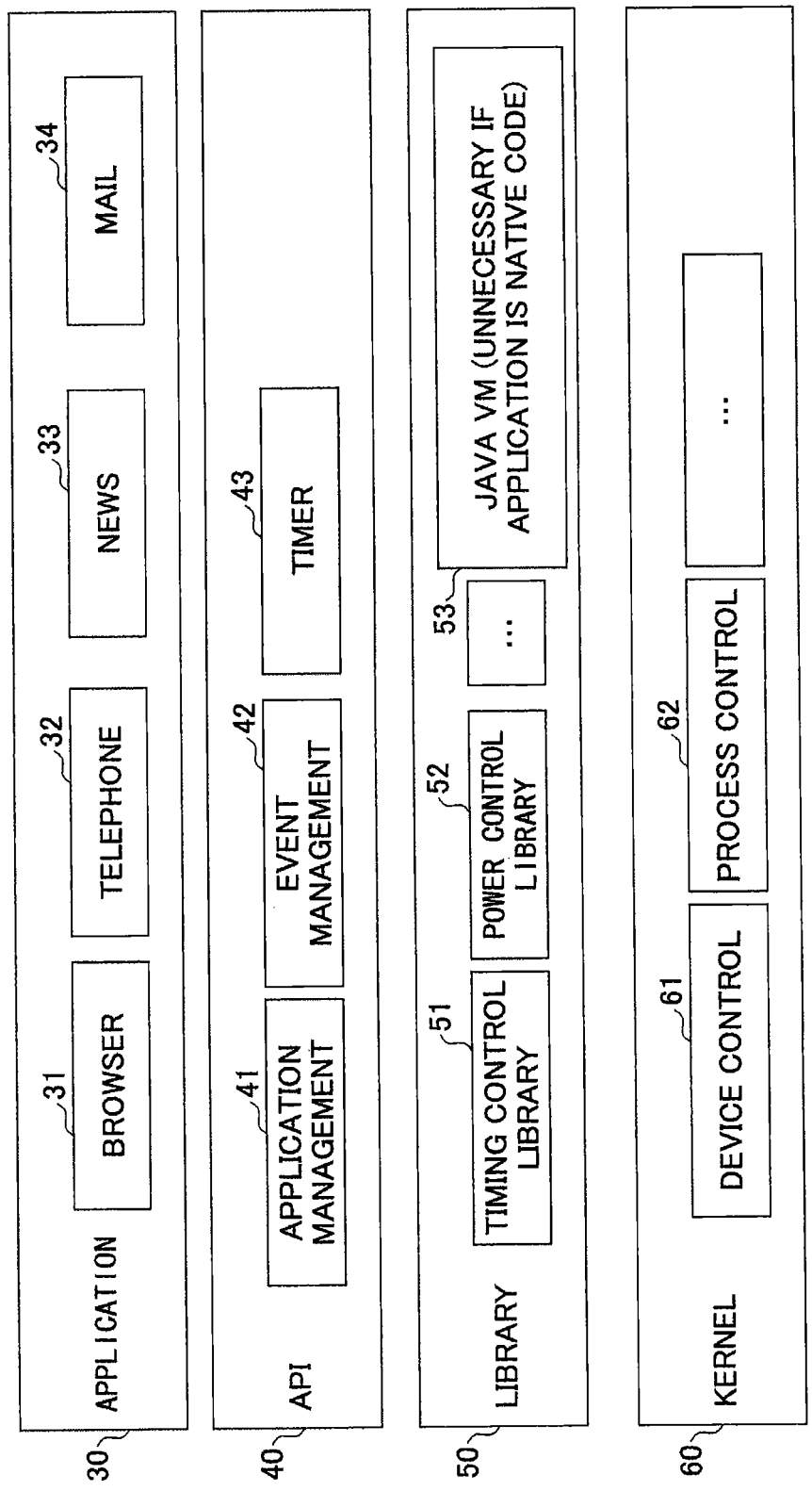
FIG. 3 is a drawing illustrating an example of the software configuration of the portable device of the present embodiment.

FIG. 3 is a drawing illustrating an example of the software configuration of the portable device 10 of the present embodiment. The portable device 10 includes an application 30, an API (Application Program Interface) 40, a library 50, and a kernel 60.

The application 30 includes a browser 31, a telephone application 32, a news application 33, and a mail application 34. The API 40 includes an application management API 41, an event management API 42, and a timer API 43.

The library 50 includes a timing control library 51, a power control library 52, and a Java (registered trademark) VM (Virtual Machine) 53. The Java VM 53 is not necessary if the application 30 is native code. The kernel 60 includes a device control unit 61 and a process control unit 62.

The browser 31 and the like included in the application 30 can use various functions by use of the functions provided by the API 40 such as the function of the application management API 41. Here, a function refers to a set of instructions that receives data referred to as parameters, and returns a result obtained by performing a predefined process.

The event management API 42 of the API 40 is called by the browser 31 or the like, for example, included in the application 30 by use of an f function, which will be described later. The event management API 42 acquires various data necessary for calculation of the f function from the timing control library 51, the power control library 52, and the like of the library 50. The event management API 42 calculates the f function to determine the polling intervals of the browser 31 and the like included in the application 30. The timing control library 51 and the power control library 52 of the library 50 acquire various data necessary for calculation of the f function from the device control unit 61 of the kernel 60.

The device control unit 61 of the kernel 60 acquires various data necessary for calculation of the f function from the device 4. The process control unit 62 of the kernel 60 controls switching of processes (i.e., tasks) of the browser 31 or the like included in the application 30.

Figure 4:
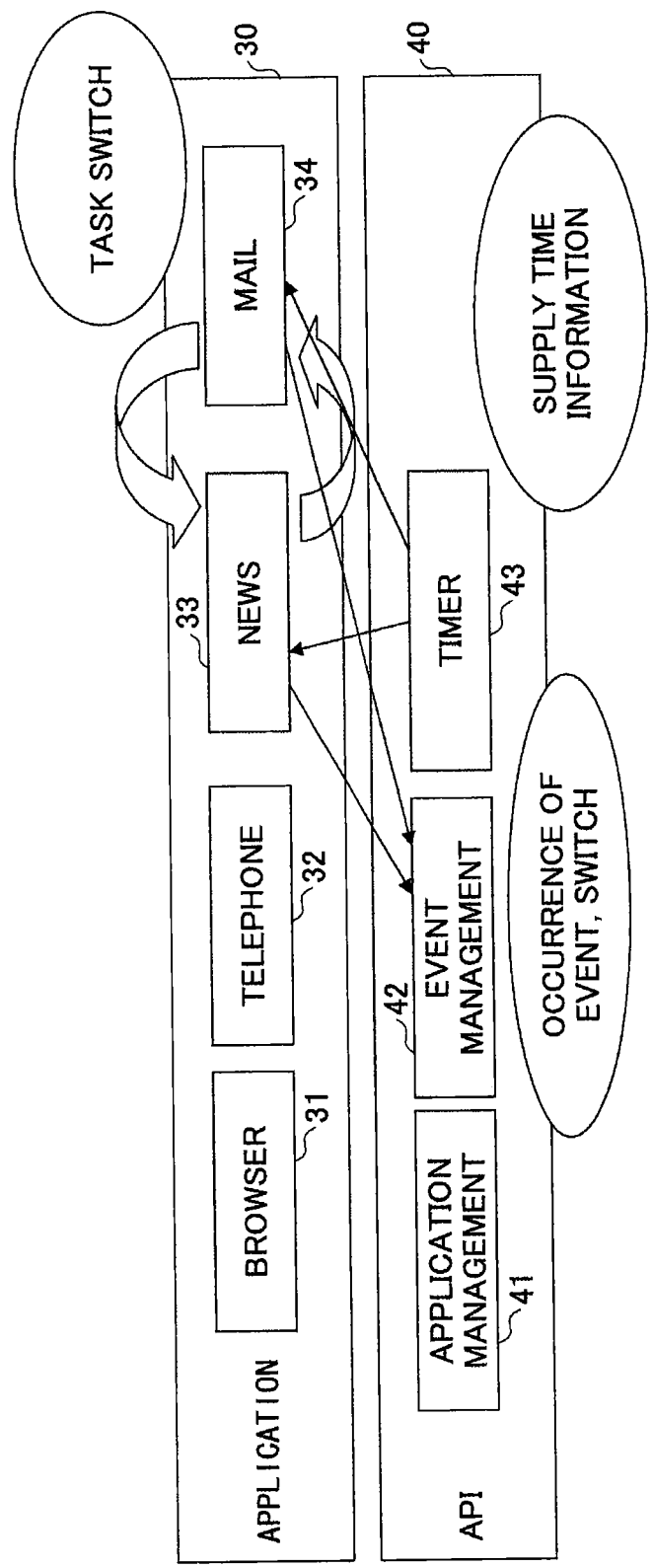
FIG. 4 is an illustrative drawing for explaining the process that causes a browser and the like included in an application to operate at the polling intervals determined by an event management API.

FIG. 4 is an illustrative drawing for explaining the process that causes the browser 31 and the like included in the application 30 to operate at the polling intervals determined by the event management API 42. It may be noted that FIG. 4 illustrates the application 30 and the API 40 extracted from the software configuration illustrated in FIG. 3.

The news application 33 and the mail application 34 included in the application 30 are subjected to task switching performed by the process control unit 62 of the kernel 60. The event management API 42 of the API 40 is notified of the occurrence of an event through the f function by the news application 33 and the mail application 34 included in the application 30.

The event management API 42 calculates the f function as will be described later to determine the polling intervals of the news application 33 and the mail application 34 included in the application 30. The event management API 42 notifies the news application 33 and the mail application 34 included in the application 30 of the polling intervals of operations. The timer API 43 provides time information upon being called by the news application 33 and the mail application 34 included in the application 30.

Figure 5:
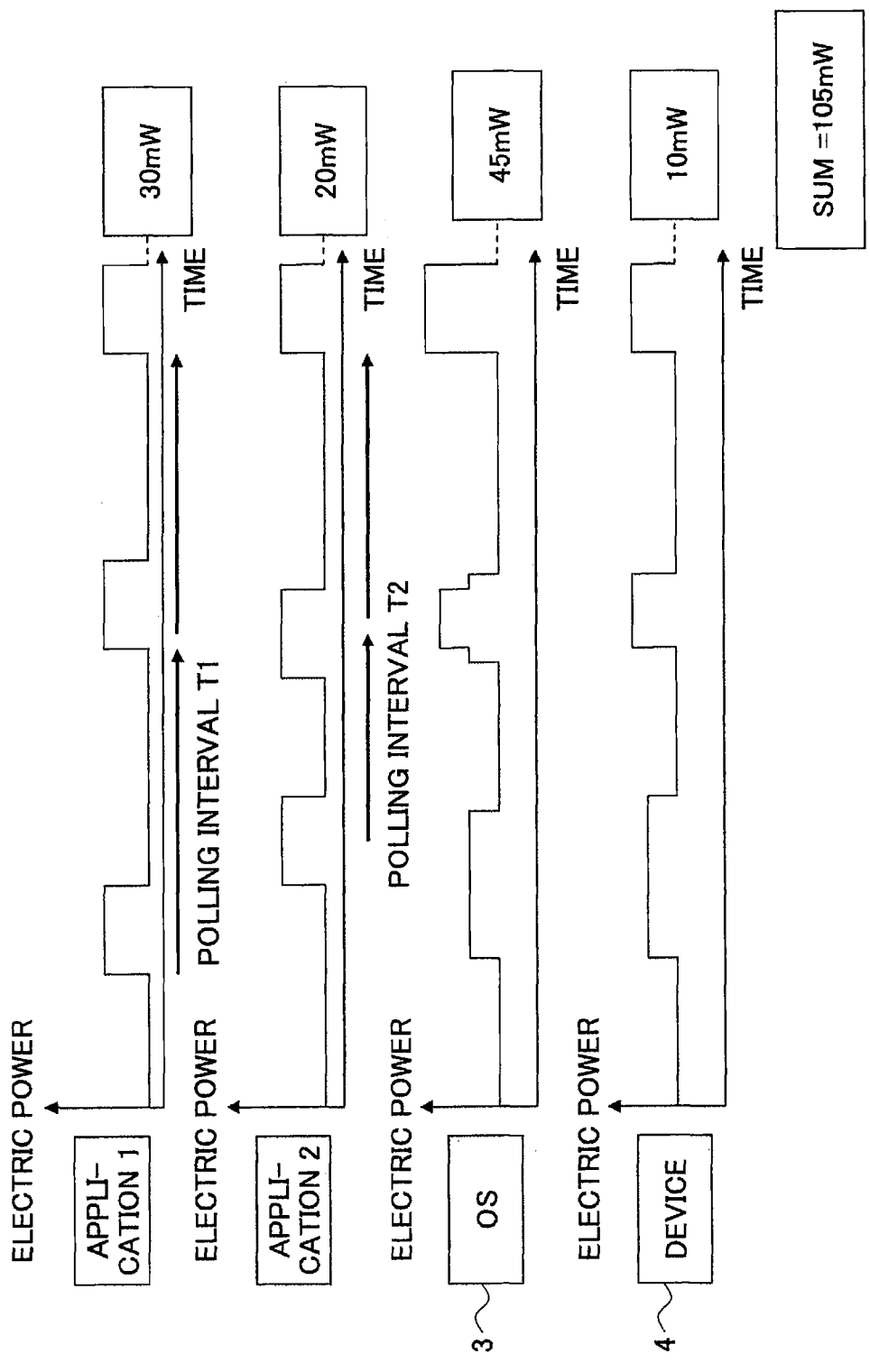
FIG. 5 is an illustrative drawing for explaining an example of power consumption in the portable device of the present embodiment.

FIG. 5 is an illustrative drawing for explaining an example of power consumption in the portable device 10 of the present embodiment. FIG. 5 illustrates transitions of power consumption made by an application 1, an application 2, an OS 3, and a device 4.

Polling intervals T1 and T2 of the applications 1 and 2 are not determined by the applications 1 and 2 themselves. The event management API 42 of the API 40, operating in cooperation with the timer API 43, notifies the applications 1 and 2 of the polling intervals T1 and T2. The event management API 42 provides the polling intervals T1 and T2 for the applications 1 and 2 such that the efficient use of electric power is maximized for the applications 1 and 2. It may be noted that the polling intervals T1 and T2 may not be stationary. The polling intervals T1 and T2 determined by the event management API 42 are determined such that the effectiveness of electric power is maximized.

The application 1 operates at the polling interval T1. The application 2 operates at the polling interval T2. Namely, the application 1 and the application 2 operate at the polling intervals T1 and T2, respectively, which are determined by the event management API 42. It may be noted that restrictions necessary for the applications 1 and 2 to perform critical operations are reported from the applications 1 and 2 to the event management API 42.

Figure 1:
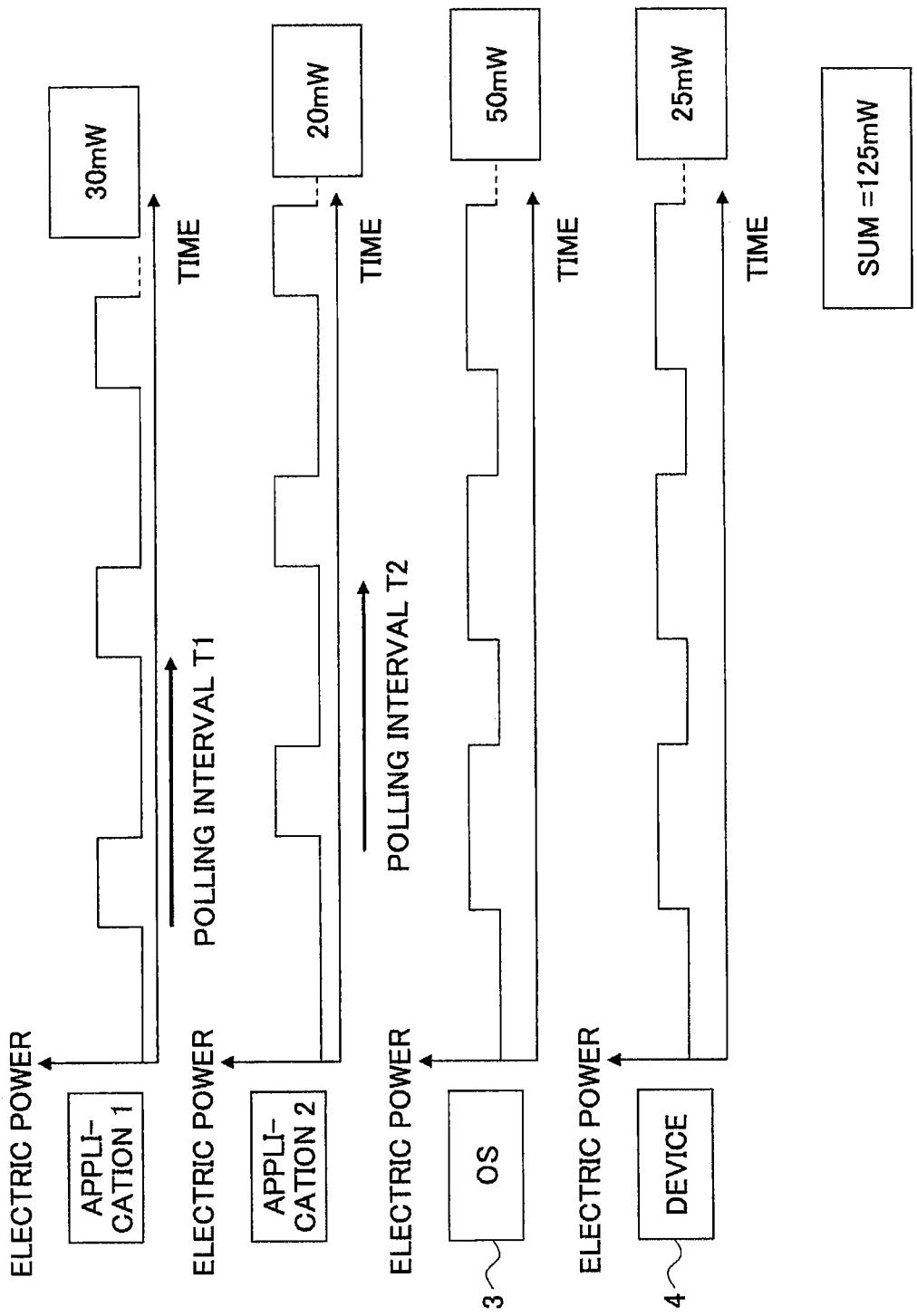
FIG. 1 is a drawing illustrating an example of power consumption in a related-art portable device.

As in FIG. 1, it is assumed in this example that there is no process other than the application 1 and the application 2. The application 1 and the application 2 use the device 4 that is their hardware resource. Further, it is assumed that the powers consumed by the application 1 and the application 2 are responsive to the time lengths of their respective accesses to the CPU 11 or memory 16. The CPU 11 enters the low power consumption state when all the processes are in the standby state.

The OS 3 and the device 4 exhibit large power consumption during the periods in which the application 1 and the application 2 operate. In the example illustrated in FIG. 5, the period during which the application 1 operate and the period during which the application 2 operate are gradually brought closer to and aligned with each other with the passage of time. As a result, the period during which the OS 3 and the device 4 exhibit large power consumption decreases in length in the example illustrated in FIG. 5. It may be noted that the applications 1 and 2 can share and use the device 4 in a time-division manner, for example, even when the periods of use by the applications 1 and 2 overlap each other in FIG. 5.

In the example illustrated in FIG. 5, the sum of powers consumed by the application 1, the application 2, the OS 3, and the device 4 is 105 mW. The sum of powers consumed by the application 1, the application 2, the OS 3, and the device 4 is 20-mW lower than the sum observed in the example illustrated in FIG. 1 because of the shortening of the period during which the OS 3 and the device 4 exhibit large power consumption.

In this manner, the portable device 10 of the present embodiment uses the event management API 42 to determine the polling intervals T1 and T2 for the applications 1 and 2, such that the applications 1 and 2 operate in a coordinated manner. As a result, the periods during which at least one of the application 1 and the application 2 operates can be adjusted, thereby shortening the period during which the OS 3 and the device 4 exhibit large power consumption, and thus reducing the sum of consumed powers.

FIG. 6 is a drawing for illustrating an example of the f function provided by the event management API 42. PowerApiLevel1 is an index of power consumption for the application 1, and is specified by the application 1. PowerApiLevel2 is an index of power consumption for the application 2, and is specified by the application 2. PowerApiLevel1 and PowerApiLevel2 serve to adjust the range of fluctuation of the polling intervals T1 and T2, which will be described later.

Polling1 is an ideal polling interval intended for the application 1. Polling2 is an ideal polling interval intended for the application 2. Polling1 and Polling2 are set on a loop-by-loop (i.e., thread-by-thread) basis for the application 1 and the application 2, respectively.

The application 1 specifies PowerApiLevel1 and Polling1 when calling the f function of the event management API 42. The event management API 42 determines the polling interval T1 of the application 1 based on the parameters specified in the f function and data acquired from the timing control library 51, the power control library 52, and the like of the library 50, as will be described later. The event management API 42 returns the polling interval T1 of the application 1 as a result of the f function.

The application 2 specifies PowerApiLevel2 and Polling2 when calling the f function of the event management API 42. The event management API 42 determines the polling interval T2 of the application 2 based on the parameters specified in the f function and data acquired from the timing control library 51, the power control library 52, and the like of the library 50, as will be described later. The event management API 42 returns the polling interval T2 of the application 2 as a result of the f function.

The f function may be defined as formula (1), for example.

$$f(PowerApiLevel1, Polling1) = \qquad (1)$$
$$Polling1 + \frac{(Polling1 - (CurrentTime - LastPollingTime)) \times Constant}{\left(\frac{1}{PowerApiLevel1} \times BatteryLife\right)}$$

LastPollingTime represents the time at which the latest polling was performed by any process. CurrentTime represents the time of the present moment. The event management API 42 acquires LastPollingTime and CurrentTime from the timing control library 51 of the library 50.

Further, BatteryLife represents an index of battery power supply such as the consumed charge or remaining charge of the battery obtained from the device 4. BatteryLife assumes a value that is in the range of 0 to 1 inclusive. Further, PowerApiLevel1 in formula (1) assumes a value that is larger than or equal to 1.

The first term in formula (1) is Polling1 that is an ideal polling interval intended for the application 1. The second term in formula (1) indicates a range of fluctuation of the polling interval T1. When a long-term average is taken, the polling interval T1 becomes equal to Polling1 that is an ideal polling interval intended for the application 1. However, the time of each polling is brought closer to the time of the closest polling. In the case in which only the application 1 is operating, the polling interval T1 is always equal to Polling1 that is an ideal polling interval intended for the application 1.

As illustrated in formula (1), the polling interval T1 has a range of fluctuation that increases as PowerApiLevel1 increases and as BatteryLife decreases. The larger the range of fluctuation, the shorter time it takes for alignment to be achieved between the time at which the application 1 operates and the time at which the application 2 operates. A large range of fluctuation means that reduction in power consumption is put ahead of using Polling1 that is an ideal polling interval intended for the application 1.

Further, the polling interval T1 has a range of fluctuation that decreases as PowerApiLevel1 decreases and as BatteryLife increases. The smaller the range of fluctuation, the longer time it takes for alignment to be achieved between the time at which the application 1 operates and the time at which the application 2 operates. A small range of fluctuation means that using Polling1 that is an ideal polling interval intended for the application 1 is put ahead of reduction in power consumption.

In the example of formula (1), an increase in the value of PowerApiLevel1 (e.g., the amount of power consumed by the application 1) means that increased priority is given to reduction in power consumption. Further, a decrease in the value of BatteryLife (e.g., the remaining battery charge) means that increased priority is given to reduction in power consumption. The constant in formula (1) is a parameter used for the purpose of further fluctuating the polling interval T1.

The f function may also be defined as formula (2), for example.

$$f(PowerApiLevel1, Polling1) = \qquad (2)$$
$$Polling1 + \frac{(Polling1 - (CurrentTime - LastPollingTime)) \times Constant}{\exp\left(\frac{1}{PowerApiLevel1} \times BatteryLife\right)}$$

Formula (2) is obtained by replacing the denominator of the second term of formula (1) with an exponential function thereof. In formula (2), the effect of PowerApiLevel1 and BatteryLife can be reduced compared to such an effect in formula (1).

Figure 7:
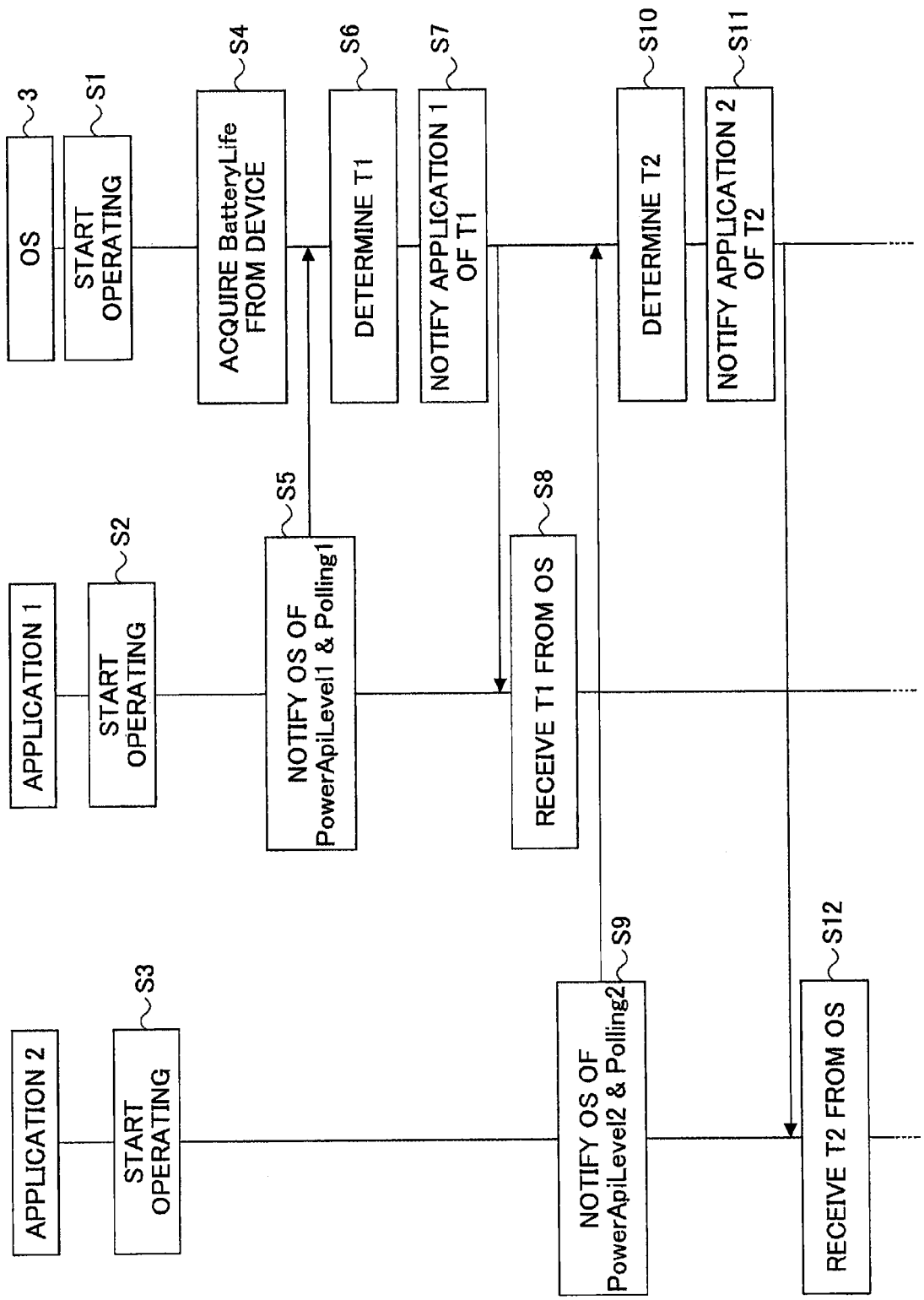
FIG. 7 is a flowchart illustrating the procedure that causes applications to operate at the polling intervals determined by an OS.

FIG. 7 is a flowchart illustrating the procedure that causes the application 1 and the application 2 to operate at the polling intervals determined by the OS 3. In step S1, the OS 3 starts operating. In steps S2 and S3, the applications 1 and 2 start operating, respectively. In step S4, the OS 3 acquire BatteryLife from the device 4.

In step S5, the application 1 notifies the OS 3 of PowerApiLevel1 and Polling1 as parameters of the f function. In step S6, the OS 3 calculates the f function to determine the polling interval T1 of the application 1. In step S7, the OS 3 notifies the application 1 of the polling interval T1.

In step S8, the application 1 receives the polling interval T1 from the OS 3, and operates at the polling interval T1.

In step S9, the application 2 notifies the OS 3 of PowerApiLevel2 and Polling2 as parameters of the f function. In step S10, the OS 3 calculates the f function to determine the polling interval T2 of the application 2. The polling interval T2 is calculated by use of previously noted formula (1) or formula (2) in which LastPollingTime indicates the latest polling time of the application 1.

In step S11, the OS 3 notifies the application 2 of the calculated polling interval T2. In step S12, the application 2 receives the polling interval T2 from the OS 3, and operates at the polling interval T2.

According to the portable device 10 of the present embodiment as described above, the periods during which the application 1 and the like operate can be adjusted in response to an index of battery power supply and an index of power consumption by the application 1 and the like, thereby shortening the periods during which the OS 3 and the device 4 exhibit large power consumption, and thus reducing the sum of consumed powers.

The event management API 42 of the present embodiment may be implemented by the CPU 11 executing the power consumption management program. The processing unit may refer to applications 1 and 2. The adjusting unit may refer to the event management API 42. The control unit may refer to the timing control library 51 and the power control library 52.

According to at least one embodiment, an information processing apparatus and a power consumption management program are provided to suppress power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus performing a plurality of processes in parallel, comprising:
a plurality of processing units; and
an adjusting unit configured to determine processing intervals of the processing units on a processing-unit-specific basis to gradually align periods in which the processing units operate, wherein the periods in which the processing units operate are brought closer to each other on a step-by-step basis with passage of each processing interval, and wherein the periods in which the processing units operate are determined by factoring in both power consumption by the processing units and a remaining charge of power supply to the information processing apparatus.

2. The information processing apparatus as claimed in claim 1, wherein the adjusting unit is configured to determine a processing interval such that the larger a difference between a present point in time and a latest point in time at which any one of the processing units operates, the shorter the processing interval is.

3. The information processing apparatus as claimed in claim 1, wherein the information processing apparatus is a portable device.

4. An information processing apparatus performing a plurality of processes in parallel, comprising:

a plurality of processing units; and an adjusting unit configured to determine processing intervals of the processing units on a processing-unit-specific basis to gradually align periods in which the processing units operate, wherein the adjusting unit is configured to change the processing intervals based on an index of power consumption by the processing units and an index of power supply to the information processing apparatus, wherein the adjusting unit is configured to determine a processing interval such that the larger a difference between a present point in time and a latest point in time at which any one of the processing units operates, the shorter the processing interval is, and wherein the adjusting unit is configured to increase the processing intervals as the power consumption by the processing units increases and as a remaining charge of the power supply to the information processing apparatus decreases, and is configured to decrease the processing intervals as the power consumption by the processing units decreases and as the remaining charge of the power supply to the information processing apparatus increases.

5. The information processing apparatus as claimed in claim 4, wherein the adjusting unit is configured to receive the processing intervals and the index of power consumption by the processing units from the processing units, and is configured to receive the index of power supply, the latest point in time, and the present point in time from a control unit configured to perform control in the information processing apparatus.

6. A non-transitory record medium having a program embedded therein for managing power consumption, the program causing a computer to perform:

functioning as a plurality of processing units to perform a plurality of processes in parallel; and determining processing intervals of the processing units on a processing-unit-specific basis to gradually align periods in which the processing units operate, wherein the periods in which the processing units operate are brought closer to each other on a step-by-step basis with passage of each processing interval, and wherein the periods in which the processing units operate are determined by factoring in both power consumption by the processing units and a remaining charge of power supply to the computer.

* * * * *